United States Patent
Srinivasan et al.

(10) Patent No.: US 10,466,760 B2
(45) Date of Patent: Nov. 5, 2019

(54) ENERGY CONSUMPTION MANAGEMENT BASED ON GAME THEORETICAL DEVICE PRIORITIZATION

(71) Applicant: Landis+Gyr Innovations, Inc., Alpharetta, GA (US)

(72) Inventors: Mohit Srinivasan, Atlanta, GA (US); David Decker, Atlanta, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 116 days.

(21) Appl. No.: 15/865,884

(22) Filed: Jan. 9, 2018

(65) Prior Publication Data
US 2019/0212802 A1   Jul. 11, 2019

(51) Int. Cl.
| G06F 1/26 | (2006.01) |
|---|---|
| G06F 1/32 | (2019.01) |
| G06F 1/3215 | (2019.01) |
| G06F 1/3287 | (2019.01) |
| G06F 1/3212 | (2019.01) |
| H04W 52/02 | (2009.01) |

(52) U.S. Cl.
CPC .......... *G06F 1/3215* (2013.01); *G06F 1/3212* (2013.01); *G06F 1/3287* (2013.01); *H04W 52/0277* (2013.01)

(58) Field of Classification Search
None
See application file for complete search history.

(56) References Cited

U.S. PATENT DOCUMENTS

| 8,010,250 | B2 * | 8/2011 | Borumand | H02J 1/14 700/295 |
|---|---|---|---|---|
| 8,410,633 | B2 * | 4/2013 | Batzler | H02J 3/14 307/39 |
| 2014/0371936 | A1 | 12/2014 | Kamel et al. | |
| 2017/0278199 | A1 | 9/2017 | Wu et al. | |

OTHER PUBLICATIONS

Van Der Hoek et al., Cooperative Equilibrium, Proc. of 9th Int. Conf. on Autonomous Agents and Multiagent Systems (AAMAS 2010), May 2010, 15 pages.
Kok, The PowerMatcher: Smart Coordination for the Smart Electricity Grid, TNO, SIKS Dissertation Series, May 13, 2013, 314 pages.
Parkes, Game Theory, CS 286r, 2002, 22 pages.
(Continued)

*Primary Examiner* — Nitin C Patel
(74) *Attorney, Agent, or Firm* — Kilpatrick Townsend & Stockton LLP

(57) ABSTRACT

An energy allocation system may include a group of agents, each agent corresponding to a device requesting an amount of energy. The energy allocation system may perform a comparison, such as a hybridized comparison, between a selected agent and each other agent included in the group. Based on the outcome of each comparison for the selected agent, an aggregated outcome for the selected agent is determined. The aggregated outcome for the selected agent is compared to a threshold for the energy allocation system. Based on the comparison of the aggregated outcome to the threshold, the selected agent either receives the requested amount of energy or receives an instruction to enter a low-power state.

20 Claims, 5 Drawing Sheets

(56) References Cited

OTHER PUBLICATIONS

Srinivasan et al., Dynamic Power Allocation Using Stackelberg Game in a Wireless Sensor Network, IEEE, Accession No. 16121793, 2016, 10 pages.
International Application No. PCT/US2019/012494 , "International Search Report and Written Opinion", dated Feb. 28, 2019, 12 pages.

* cited by examiner

ENERGY CONSUMPTION MANAGEMENT BASED ON GAME THEORETICAL DEVICE PRIORITIZATION

FIELD OF THE INVENTION

This disclosure relates generally to the field of management of energy consumption, and more specifically relates to prioritizing devices based on game theory.

BACKGROUND

Management of energy consumption is a technique used in distribution of electrical energy. A consumer of electrical energy may require electrical energy, such as to operate one or more electrical devices. A producer of electrical energy, such as a utility company, a utility cooperative organization, or an individual (e.g., with home energy generation equipment), may provide surplus electrical energy, such as for compensation (e.g., money, points, etc.). However, a quantity of available energy offered by the producers may be insufficient to meet the demand of the devices operated by one or more consumers. In addition, a consumer may wish to reduce the quantity of energy consumed, such as to reduce financial costs associated with the energy consumption. It may be desirable to manage the electrical energy provided to the devices, such as to improve efficiency, ensure an equitable distribution of available energy, or to achieve another desired outcome.

In some cases, the consumer may manage energy consumption by applying a prioritization technique to multiple devices that require energy. For example, an agent may be associated with one or more devices that are capable of consuming energy. The agent might represent a single device, or a group of devices (e.g., devices in a particular building, devices operated by a particular consumer). An agent with a higher priority level may receive energy sooner than an agent with a lower priority level. The energy may be provided based on a comparison of the priority levels for all of the agents, or devices, or both, that are included in the prioritization technique. A competitive comparison (e.g., comparing the priority level of each agent) may provide energy to agents with higher priority levels. However, such a prioritization technique may fail to provide energy to agents with lower priority levels, resulting in frustration for the consumer.

It is desirable to develop techniques to optimize management of energy consumption by a group of devices. In addition, it is desirable to develop techniques to cooperatively compare priority levels of agents that represent devices.

SUMMARY

According to certain implementations, an agent corresponds to at least one device having an energy requirement level and a priority level. Energy may be allocated among multiple agents based, in part, on the energy requirement level and priority level of each agent, and a comparison between each set of agents in the group of agents.

For example, in a group of agents, each agent is compared to each other agent in the group. For a particular selected agent, the priority level of the selected agent may be compared to the priority level of each remaining agent in the group. An importance factor is determined based on the comparison of the priority levels, the importance factor indicating a relative importance of the selected agent as compared to the remaining agents. Based on the relative importance factor associated with each remaining agent, the selected agent is either prioritized or deprioritized, as compared to each remaining agent in the group.

In addition, for each particular agent in the group, an aggregated outcome is determined, the aggregated outcome representing a number of times the particular agent was prioritized as compared to the remaining agents in the group. The aggregated outcome of each agent is compared to a threshold, such as a voting threshold. If the aggregated outcome for a particular agent exceeds the threshold, the particular agent is allocated energy based on the energy requirement level. If the aggregated outcome for the particular agent is within the threshold, the particular agent is instructed to enter a low-power mode (e.g., a sleep state, a powered-down state).

These illustrative implementations are mentioned not to limit or define the disclosure, but to provide examples to aid understanding thereof. Additional implementations are discussed in the Detailed Description, and further description is provided there.

BRIEF DESCRIPTION OF THE DRAWINGS

Features, implementations, and advantages of the present disclosure are better understood when the following Detailed Description is read with reference to the accompanying drawings, where.

DETAILED DESCRIPTION

Figure 1:
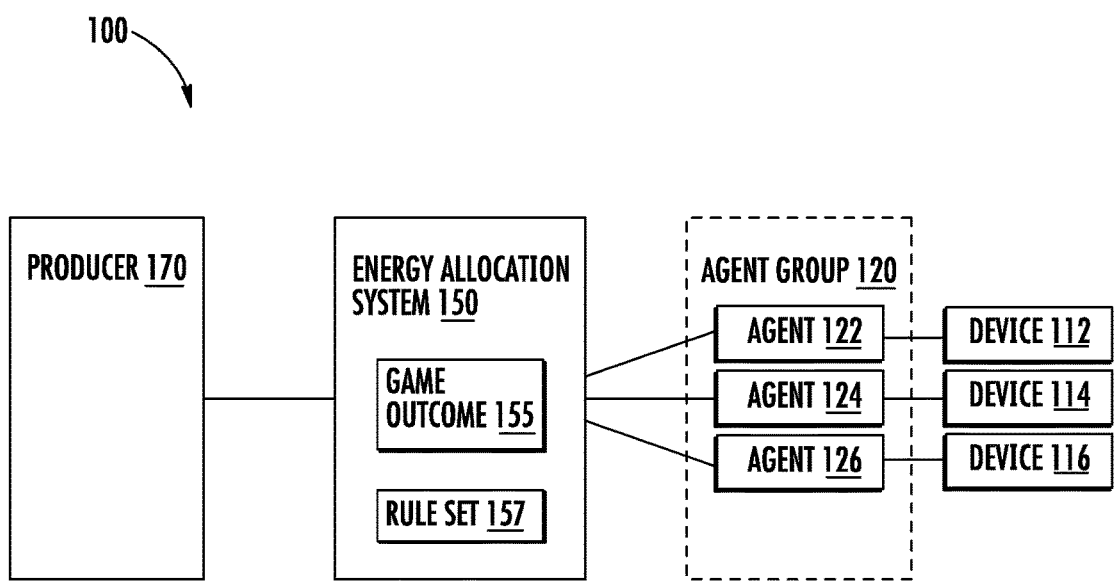
FIG. 1 is a block diagram depicting an example of a system for allocating electrical energy among one or more devices.

As discussed above, prior techniques for prioritizing devices may compare relative priorities competitively. However, prior techniques for prioritizing devices do not provide cooperative techniques to compare the relative priorities of multiple devices. Nor do the prior techniques provide cooperative techniques to adjust operation of a device based on a pairwise comparison of multiple agents corresponding to devices. Certain implementations described herein provide for a cooperative comparison of multiple agents corresponding to devices capable of consuming electrical energy. Based on the cooperative comparison of the agents, an allocation of energy among the agents is determined. The allocation of energy may represent an optimal allocation for the agents included in the cooperative comparison. For example, the optimal allocation may reduce the amount of energy provided (e.g., to not exceed the capacity of an energy provider), reduce financial costs associated with energy consumption, or optimize any other suitable aspect of the energy consumption.

In some implementations, the cooperative comparison is based on a game theoretical model of agent behavior.

Although the disclosed techniques are described in regards to allocation of electrical energy and/or electrical power, the disclosed techniques may be applied to allocation of other resources, such as communication resources (e.g., network bandwidth, spectrum share, time duration of a broadcast, time duration of a telephone communication), water resources, transportation resources (e.g., transit schedules, delivery schedules), petroleum resources, or any other suitable resource. In some implementations, the disclosed techniques may be applied to multi-agent robotic systems for implementing a strategy to achieve a shared goal For example, a group of multiple autonomous robots with various levels of available energy (e.g., different battery levels) may use some or all or the disclosed techniques to determine each robot's portion of a group task.

The following examples are provided to introduce certain implementations of the present disclosure. In an implementation, each agent in a group of agents represents one or more devices. For example, an agent might represent a particular device, a group of devices associated with a geographical location (e.g., a building, a neighborhood, a county), a group of devices associated with a function (e.g., heating/cooling devices, household entertainment devices), a group of devices having a type of operation (e.g., battery-operated, electrical motors, solid-state electronics), or any other suitable grouping of devices. In some cases, an agent may be associated with a "smart device," such as a device capable of receiving, analyzing, and responding to communications without human interaction. In addition, the agent may be associated with an "Internet-of-Things device" (e.g., an "IoT device"), such as a smart device capable of communicating via a data network connection. For example, an IoT device may connect to and transmit or receive information via a data network, such as (without limitation) a local data network, a wireless data network, a data network included in an energy distribution network (e.g., via a power line communication ("PLC") protocol), or a data network associated with mobile telecommunications (e.g., a "3G" network, an "LTE" network). An IoT device may communicate with the agent, with other IoT devices, with computer systems not included in an IoT device (e.g., a personal mobile device, a virtual or distributed computing system), with a user interface device (e.g., keyboard, monitor), or with any other suitable recipient.

In some cases, the agent may operate on the device, such as an agent module that is included in software on a memory component of the device. In addition, the agent may operate on a separate platform, such as an energy allocation system. Non-limiting examples of an energy allocation system include a home energy management system ("HEMS") associated with a household, a local energy management system associated with a utility sub-station, or a regional energy management system associated with some or all of a utility distribution grid. The energy allocation system may include one or more agent modules included in software on a memory component of the energy allocation system. An agent module included in the energy allocation system may communicate with the one or more devices with which it is associated. For example, a device associated with an agent may provide to the agent information regarding the device's energy requirement level, operational state (e.g., on, off, standby, malfunction), or other suitable information.

In some cases, the device may provide to the agent information indicating a priority level or energy requirement level of the device. In addition, the agent may determine a priority level or energy requirement level of the device, such as based on information describing the device. For example, the priority level of the device may be based on a function (e.g., lighting, home appliance), a period of time (e.g., estimated time to charge a battery), an attribute (e.g., an attribute indicating "high importance"), or any other suitable information associated with the device. In some cases, an attribute associated with the device is based on information received from a user, such as via a user interface capable of communicating with the agent or the energy allocation system. In addition, the energy requirement level of the device may be based on a function of the device or a level of operation (e.g., a temperature setting, a high/medium/low setting), or any other suitable information. In some cases, the energy requirement level may be based upon a period of time, such as a period of time for a cycle of operation (e.g., energy consumed during a drying cycle of a clothes dryer) or a given period of time (e.g., energy consumed during one minute of operation of a ceiling fan).

In an implementation, multiple agents may participate in a cooperative comparison of the multiple agents. For convenience, and not by way of limitation, a cooperative comparison among multiple agents may be referred to herein as a "game." A game may include a comparison of each agent with each of the remaining agents. For convenience, and not by way of limitation, a comparison (e.g., one comparison among multiple comparisons in a game) may be referred to herein as a "round" of the game. The comparison may result in an outcome, such as an outcome matrix. The comparison may be pairwise, such as by comparing a particular selected agent to each one of the remaining agents individually (e.g., one-to-one comparison). In addition, the comparison may be groupwise, such as by comparing one or more selected agents to a group of the remaining agents (e.g., one-to-many comparison, many-to-many comparison).

In addition, a game may be based on one or more rules, such that a particular rule affects a comparison. For example, a rule may indicate that a selected agent is compared pairwise to each other remaining agent. Another rule may indicate that the comparison is based on respective priority levels of the compared agents. An additional rule may indicate that the outcome of the comparison is based on respective energy requirement levels of the compared agents. In some cases, a rule may be modified, introduced, or removed from the game. One skilled in the art will recognize that game rules may affect different aspects of a comparison, or may affect a comparison in different ways. For example, a game intended to minimize monetary cost of energy consumption for a group of agents may include one or more different rules from a game intended to maximize a percentage of renewable energy sources for the group of agents. In addition, a rule may affect other rules used during a round of the game. For example, a rule indicating a comparison of an agent's priority level to a threshold value may affect additional rules used during the round, such as determining the round's outcome based on a first additional rule if the priority level is above the threshold, and determining the round's outcome based on a second additional rule if the priority level is below the threshold.

In an implementation, energy allocation among the agents may be determined based on one or more outcomes of the rounds of a game. For example, a game that includes four agents compared pairwise may have six rounds (e.g., each agent compared once to each other agent). Each of the six rounds may have an outcome indicating a "winner" of the round. In some cases, a round may have multiple winning agents (e.g., a tie condition). An aggregated outcome may be determined for each agent, such as an indication of a number of rounds the agent has won. For example, a particular agent that has won three of the six rounds may have an aggregated outcome of three. Energy allocation to the particular agent may be based on the aggregated outcome. For example, the particular agent may be allocated energy if the aggregated outcome exceeds a threshold, such as a voting threshold, and given an instruction to enter a low-power state if the aggregated outcome does not exceed the threshold. In addition, the particular agent may be allocated energy if the aggregated outcome has a relationship to the aggregated outcomes of the other agents (e.g., a maximum or a minimum of the agents' aggregated outcomes). In addition, the particular agent may be allocated energy in proportion to the aggregated outcome (e.g., an allocation of 50% of the available energy, based on three wins out of six rounds total). In some cases, other allocation techniques based on the aggregated outcomes may be used. In addition, a priority level may be adjusted based on a game outcome. For example, a priority level associated with a "losing" device (e.g., a device that did not receive an allocation of energy during a previous game) may be increased, to improve a likelihood that the device will receive an energy allocation in a subsequent game.

Referring now to the drawings, FIG. 1 is a diagram of an exemplary system 100 in which electrical energy provided by a producer, such as producer 170, is allocated among one or more devices capable of consuming electrical energy, such as devices 112, 114, and 116. The producer may be an electrical utility company, an electrical cooperative organization, an individual, or another entity that is capable of providing electrical energy. The energy may be produced by generation, such as via hydroelectric generators, steam-operated generators (e.g., coal, nuclear power, gas, biomass), solar panels, wind turbines, or any other suitable generation technique or equipment. In addition, the energy may be produced by a release of stored energy, such as from one or more batteries, capacitors, or any other suitable storage technique or equipment. In some cases, the producer 170 may also consume energy. For example, a household that includes one or more devices capable of consuming energy may also produce energy via a solar panel array. The allocation techniques described herein may allocate energy to devices associated with a producer, or to other devices unassociated with the producer, or to a combination of devices. For example, the exemplary household with a solar panel array may allocate the generated solar energy among the household devices, or to other devices in neighboring buildings, or to a combination of household and neighboring devices.

In some implementations, each of the devices 112, 114, and 116 is associated with a respective agent. For example, agent 122 may correspond to device 112, agent 124 may correspond to device 114, and agent 126 may correspond to device 116. In some cases, one or more of the agents 122, 124, or 126 may be associated with additional devices. For example, agent 122 may correspond to a group of devices that includes device 112.

In the system 100, each of the agents 122, 124, and 126 may be included in a group of agents 120. The agent group 120 may include agents that have a common attribute or correspond to devices having a common attribute, such as a geographical location, a type of function, a type of operation, or any other suitable attribute or combination of attributes. For example, the agent group 120 may include agents corresponding to devices sharing a function attribute (e.g., household appliances) and a geographic attribute (e.g., a street address).

In some implementations, the agent group 120 may participate in a cooperative comparison, such as a game conducted between the agents in the group 120. In addition, energy provided by the producer 170 may be allocated among agents in the agent group 120 based on the cooperative comparison. In system 100, an energy allocation system 150, such as a HEMS, may perform or manage at least a portion of the cooperative comparison. The energy allocation system 150 may be a system (or a component of a system), such as a processor and memory device. The energy allocation system 150 may be included in a specialized device (e.g., a standalone hardware device), in an electrical utility meter, in a component of an electrical distribution system, or in any other suitable system. In addition, the energy allocation system 150 may be implemented by operations performed by one or more computing systems, including remote or distributed computing systems (e.g., a cloud-based system).

In system 100, the energy allocation system 150 may perform operations related to the cooperative comparison of agents in the group 120. For example, each of agents 122, 124, and 126 may be compared to each other agent in the agent group 120, such as during rounds in a game. An outcome may be determined for each round, based on the comparison (or other operations) performed during the round. The energy allocation system 150 may determine a game outcome 155 based on one or more of the round outcomes. In some cases, the energy allocation system 150 may perform the rounds of the game, such as by executing suitable program code to perform one or more of the comparisons, and determine the game outcome 155 based on the outcomes of the performed rounds. In addition, the energy allocation system 150 may receive information indicating the outcome of a round, such as from one or more agents in the agent group 120, and determine the game outcome 155 based on the received information. In some cases, the cooperative comparison is performed responsive to an indication received by the energy allocation system 150. For example, the energy allocation system 150 may receive an indication that energy prices have risen above a threshold. In addition, the energy allocation system 150 may receive an indication to reduce overall consumption. Such indications may be received from the producer 170, from a household member (e.g., via a user interface), or from another suitable source. Responsive to receiving an indication, the energy allocation system 150 may perform one or more cooperative comparisons, such as to optimize energy allocation until a further indication is received.

In some cases, the round outcomes, or the game outcome 155, or both, are affected by one or more rules included in rule set 157. For example, the energy allocation system 150 may determine the game outcome 155 based on the rule set 157. In addition, the energy allocation system 150 may provide information representing the rule set 157 to one or more agents in the agent group 120. In some cases, the rule set 157 may be adjusted, such as by adding, removing, or modifying a rule in the rule set 157. For example, an operator (e.g., an owner, a user) of the devices 112, 114, and 116 may adjust rule set 157 to optimize an allocation of energy by the energy allocation system 150 to devices associated with the agent group 120. The adjustment may be intended to minimize energy consumption, to minimize costs associated with energy consumption, to maximize a ratio of energy from renewable sources compared to non-renewable sources, to achieve a state of operation (e.g., maintaining a particular heating/air conditioning state), or to achieve another suitable optimization.

In some implementations, the operation of one or more devices associated with the agent group 120 is modified based on the game outcome 155. The device operations may be modified based on instructions, such as instructions received from energy allocation system 150, producer 170, or another source. For example, based on a game outcome 155 indicating that agent 122 has a winning condition, the device 122 may receive an instruction to turn on, to continue operation, to enter a high-power state, or another suitable operational state. In addition, based on a game outcome 155 indicating that agent 124 has a losing condition, the device 124 may receive an instruction to turn off, to reduce operation, to enter a low-power state (e.g., sleep, standby, shortened time period of operation), or another suitable operational state.

In system 100, the producer 170 may provide electrical energy to the devices 112, 114, and 116 based on the game outcome 155. For example, the energy allocation system 150 may provide to the producer 170 information representing the game outcome 155. Based on the information, the producer 170 may provide an allocated quantity of energy to one or more of the devices 112, 114, or 116. In some cases, the producer 170 may provide the energy directly to the devices, such as via an electrical energy distribution system (e.g., utility lines, in-building wiring system, wireless power distribution system). In addition, the producer 170 may provide the energy to the devices via the energy allocation system 150. For example, the energy allocation system may be associated with an electrical meter or other component of an electrical energy distribution system.

Conventional energy allocation systems may allocate energy without comparing devices or agents of devices. For example, a non-comparative allocation system, such as a "selfish" system, may provide energy to any requesting device, such as based on the device being powered up. However, the non-comparative allocation system may provide energy to a large quantity of requesting devices, resulting in a shortage of available energy for all of the requesting devices, or resulting in allocation of energy exceeding a threshold of consumed resources (e.g., financial, energy). The shortage of energy, as distributed by the non-comparative allocation system, may lead to brownouts, blackouts, or other disruptions in service. In addition, conventional energy allocation systems may allocate energy based on a comparison of devices or agents of devices. For example, a competitive allocation system, such as a "bidding" system, may allocate energy to devices based on a competitive comparison of priority levels (e.g., a monetary bid) of all devices included in the competitive comparison. The competitive allocation system may provide energy to the highest priority devices, based on an amount of energy available to the system. However, the competitive allocation system may fail to provide energy to lower priority devices, resulting in an inefficient distribution of the available energy. In addition, both a non-comparative allocation system and a competitive allocation system may allocate energy inefficiently for an overall group of devices. An energy allocation system based on cooperative comparison of devices or agents of devices, such as the example system described in FIG. 1, may provide an improved efficiency in allocation of energy, such as by achieving improvements in energy efficiency for the overall group of devices.

Figure 2:
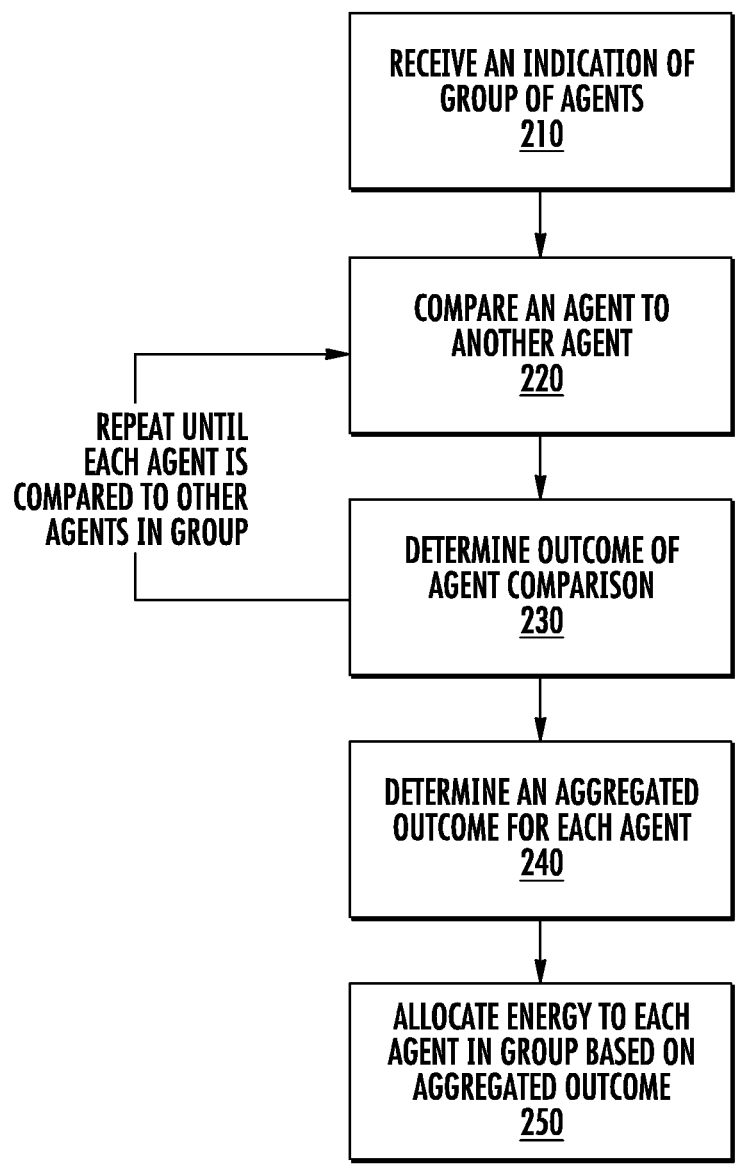
FIG. 2 is a flow chart depicting an example of a process for a cooperative comparison of agents corresponding to devices.

FIG. 2 is a flow chart depicting an example of a process 200 for a cooperative comparison of agents. In some implementations, such as described in regards to FIG. 1, a computing device executing an energy allocation system implements operations described in FIG. 2, by executing suitable program code. Additionally or alternatively, operations described in FIG. 2 are implemented by one or more agents, such as a group of agents operating on respective IoT devices. For illustrative purposes, the process 200 is described with reference to the examples depicted in FIG. 1. Other implementations, however, are possible.

At block 210, the process 200 involves receiving an indication of a group of agents. The indication may be received by an energy allocation system, such as a HEMS, or by each agent in the group of agents. For example, an additional agent may provide an indication that it wishes to join a cooperative comparison (e.g., a new device installed in a household). Other agents that receive the indication may determine that the additional agent may join a group of agents. Each agent in the group of agents may receive an indication of other agents in the group. In some cases, an agent's participation in the cooperative comparison is based in part upon security measures, such as use of a login/password combination, certificate-based device authentication, or any suitable security measure or combination of security measures. Security measures may be coordinated by the energy allocation system, by one or more of the group of agents, or by an additional computing system (e.g., a firewall, a router on a local data network).

At block 220, the process 200 involves comparing an agent in the group of agents to one or more additional agents in the group. For convenience, and not by way of limitation, an additional agent included in a comparison may be referred to as a comparison agent. The comparison may be based on a property, or combination of properties, of the agents included in the comparison. For example, a selected agent may be compared to a comparison agent based on a respective priority level of each agent. Additionally or alternatively, a selected agent may be compared to multiple comparison agents based on a respective energy requirement of each agent (e.g., the energy requirement of the selected agent compared to a sum of the energy requirements of the multiple additional agents).

At block 230, the process 200 involves determining the outcome of the comparison. Based on a comparison of priority levels, a selected agent may be determined to have a outcome in the comparison. The outcome may indicate one or more of a total outcome (e.g., win/loss) or as a partial outcome (e.g., a percentage, a sliding scale), and may be represented by data associated with the agent, including numerical data, Boolean data, text data, a data structure (e.g., a database record), or any suitable type of data. In some cases, the outcome may indicate which agent or agents were included in the comparison.

In some implementations, operations related to blocks 220 and 230 are repeated for each agent included in the group of agents. For example, in a pairwise comparison, each agent is compared once to each other agent in the group. Additionally or alternatively, operations related to blocks 220 and 230 are repeated until each agent in the group of agents has been compared to each other agent in the group. For example, in a groupwise comparison, each agent is compared to one or more other agents, until each agent in the group has been included in at least one comparison with each other agent in the group.

At block 240, the process 200 involves determining an aggregated outcome for each agent in the group of agents. Each aggregated outcome may be based on the outcomes of one or more comparisons in which the respective agent participated. For example, if a particular agent participated in three comparisons, the aggregated outcome may be based on the three outcomes of the comparisons. An aggregated outcome may be based on a combination of the comparison outcomes, such as a result of a mathematical operation, a series, a result of an applied rule, or any other suitable combination.

At block 250, the process 200 involves allocating energy to each agent in the group of agents, based on the aggregated outcome for each agent. For example, energy may be allocated to agents having an aggregated outcome above a threshold level. The threshold level may be based on a value associated with energy consumption, such as a financial cost, a consumption limit, or any other suitable value. In some cases, energy allocation may be based on instructions issued to one or more agents in the group. For example, an energy allocation system may issue instructions to an agent or to the agent's corresponding device. Additionally or alternatively, the agent may issue an instruction to the agent's corresponding device. In some cases, one or more of the energy allocation system or the agent may issue an instruction to the corresponding device to modify an operational state. For example, based on the agent having an aggregated outcome below the threshold level, the instruction may direct the device to turn off, enter a low-power state, reduce an operational level (e.g., lowering a fan speed, reducing a thermostat level), or another suitable modification. In addition, based on the agent having an aggregated outcome above the threshold level, the instruction may direct the device to turn on, to continue or increase an operational level, to enter a high-power state, or another suitable modification.

In some cases, one or more computing systems may perform operations related to particular blocks of process 200. For example, the energy allocation system 150 may perform operations related to blocks 210 through 250. Additionally or alternatively, one or more of agents 122, 124, and 126 may perform operations related to blocks 210 through 250. In addition, one or more of agents 122, 124, and 126 may perform operations related to blocks 210 through 230, and the energy allocation system 150 may perform operations related to blocks 240 and 250. One of skill in the art will recognize other implementations or configurations.

In some implementations, the cooperative comparison of the group of agents is modified to improve an allocation of energy. In some cases, a round, a game, a grouping of agents, a threshold, or another aspect of the cooperative comparison may be modified to achieve the improvement. For example, an energy allocation device may compare agents within a round based on a priority level, an energy requirement, or another characteristic (or combination of characteristics). Additionally or alternatively, the energy allocation device may determine an aggregated outcome for a particular agent in a game based on a number of winning rounds, a percentage of winning rounds, a sum of numeric scores across rounds, an average or weighted average score across rounds, or by any other suitable aggregation technique. In addition, the energy allocation device may assign agents to groups with similar usage characteristics (e.g., an agent group for mobile device charging stations, an agent group for household appliances).

In some cases, the cooperative comparison is based on a respective priority level associated with each respective agent. For example, a game between agents corresponding to appliances including a water heater, a clothes dryer, a ceiling light, and an overhead fan may be based on respective priority levels of the appliances. For example, the ceiling light and the fan may each have a relatively high priority level (e.g., to operate promptly after receiving a user command), and the water heater and clothes dryer may each have a relatively low priority level (e.g., to allow a delay before beginning operations). In some cases, the outcome of a game round is based on a numerical comparison of the priority levels of the agents. Additionally or alternatively, the outcome of a round is based on a hybridized comparison of the priority levels.

Figure 3:
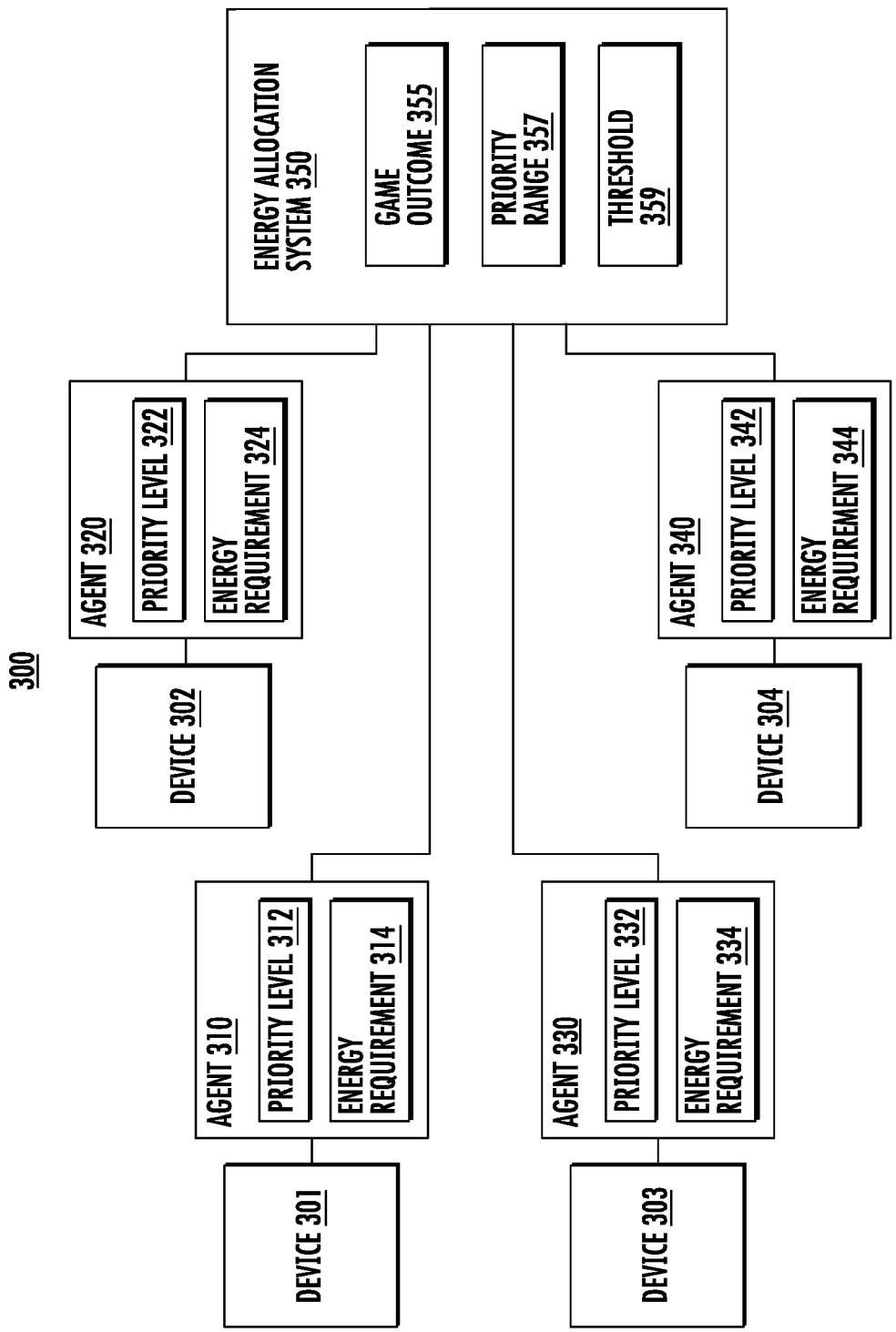
FIG. 3 is a block diagram depicting an example of a system for performing a cooperative comparison of a group of agents, based on a hybridized comparison.

FIG. 3 is a diagram depicting an example of a system 300 that performs a cooperative comparison of a group of agents, based on a hybridized comparison of the agents' priority levels. In some implementations, the system 300 includes an energy allocation system 350. In addition, the system 300 includes multiple agents corresponding to respective devices. For example a device 301, such as a fan, may correspond to an agent 310. In addition, a device 302, such as a water heater, may correspond to an agent 320; a device 303, such as a light, may correspond to an agent 330; and a device 304, such as a clothes dryer, may correspond to an agent 340. In some cases, each of the agents 310, 320, 330, and 340 may be included in a group of agents. In addition, each of the agents 310, 320, 330, and 340 may participate in a game included in the cooperative comparison for system 300. In some cases, the energy allocation system 350 performs some or all of the hybridized comparisons of the agents 310, 320, 330, and 340.

In some implementations, each of the agents includes a priority level, an energy requirement, or both. For example, agent 310 may include a priority level 312 and an energy requirement 314. In addition, agent 320 may include priority level 322 and energy requirement 324, agent 330 may include priority level 332 and energy requirement 334, and agent 340 may include priority level 342 and energy requirement 344. The priority level and the energy requirement for a particular agent may include one or more numeric values. In some cases, the priority level, the energy requirement, or both are represented by numeric data or another suitable data structure. Table 1 includes exemplary values for priority levels and energy requirements described in reference to FIG. 3, but other values may be used.

TABLE 1

| Agent (device type) | Priority Level Value | Energy Requirement Value (watts) |
|---|---|---|
| Agent 310 (fan) | 9 | 30 W |
| Agent 320 (water heater) | 5 | 1125 W |
| Agent 330 (light) | 10 | 60 W |
| Agent 340 (clothes dryer) | 2 | 3000 W |

The energy allocation system 350 (or another component of system 300) may perform a cooperative comparison of the agents 310, 320, 330, and 340 based on a hybridized comparison of the respective priority levels 312, 322, 332, and 342. Each of the agents 310, 320, 330, and 340 may participate in one or more pairwise rounds, each round including a hybridized comparison of the participating agents. For example, the agent 310 may participate in a first round against the agent 320, a second round against the agent 330, and a third round against the agent 340. In some implementations, the hybridized comparison may include a comparison of priority levels based on a priority range 357. An example (and non-limiting) value for the priority range 357 is a value of 3. In addition, an importance factor may be determined for each agent in the round based on the comparison of the priority levels.

For example, in the first round including the agent 310 and the agent 320, a difference may be determined between the value of priority level 312 and the value of priority level 322 (e.g., a difference between 9 and 5). The difference may be compared to the priority range 357 (e.g., the priority range value of 3). Responsive to determining that the difference is outside of the priority range 357 (e.g., the difference between 9 and 5 is greater than or equal to the priority range value of 3), an importance factor for each agent may be determined based on the respective priority level of the agent. For example, in the first round, the energy allocation system 350 may determine an importance factor with value 9 for the agent 310, and an importance factor with value 5 for the agent 320. The outcome of the first round may be determined based on a comparison of the importance factors for the participating agents. For example, the outcome of the first round may indicate that the agent 310 has a "winning" outcome, based on a comparison of the importance factor of value 9 to the importance factor of value 5.

In addition, in the second round between the agent 310 and the agent 330, a difference may be determined between the value of priority level 312 and the value priority level 332 (e.g., a difference between 9 and 10). The difference may be compared to the priority range 357. Responsive to determining that the difference is within the priority range 357 (e.g., the difference between 9 and 10 is less than the priority range value of 3), an importance factor for each agent may be determined based on a combination of the respective priority level and energy requirement of the agent. Equation 1 describes an example combination of a priority level and an energy requirement.

$$\beta_k = \left(\frac{PL_k}{E_k}\right)\sum_{i=1}^{n} E_i \qquad \text{Eq. 1}$$

In Equation 1, the importance factor $\beta_k$ may be determined for the kth agent in a particular round of a cooperative comparison. A ratio may be determined between the priority level $PL_k$ for the kth agent and the energy requirement $E_k$ for the kth agent. In some cases, the ratio between the priority level $PL_k$ and the energy requirement $E_k$ may be multiplied by a sum of the energy requirement $E_i$ for each agent i in the 1 through n agents included in the particular round.

For example, in the second round, the energy allocation system 350 may determine an importance factor with value 27 for the agent 310, based on a ratio between priority level 312 (e.g., value 9) and energy requirement 314 (e.g., value 30 W), multiplied by the sum of energy requirement 314 and energy requirement 334 (e.g., sum of 30 W and 60 W). In addition, the energy allocation system 350 may determine an importance factor with value 15 for the agent 330, based on a ratio between priority level 332 (e.g., value 10) and energy requirement 334 (e.g., value 60 W), multiplied by the sum of energy requirement 314 and energy requirement 334 (e.g., sum of 30 W and 60 W). The outcome of the second round may be determined based on a comparison of the importance factors for the participating agents. For example, the outcome of the second round may indicate that the agent 310 has a "winning" outcome, based on a comparison of the importance factor of value 27 to the importance factor of value 15.

Furthermore, in the third round including the agent 310 and the agent 340, a difference may be determined between the value of priority level 312 and the value of priority level 342 (e.g., a difference between 9 and 2). The difference may be compared to the priority range 357 (e.g., compared to the priority range value of 3). Responsive to determining that the difference is outside of the priority range 357 (e.g., the difference between 9 and 2 is greater than or equal to the priority range value of 3), an importance factor for each agent may be determined based on the respective priority level of the agent. For example, in the third round, the energy allocation system 350 may determine an importance factor with value 9 for the agent 310, and an importance factor with value 5 for the agent 340. The outcome of the third round may be determined based on a comparison of the importance factors for the participating agents. For example, the outcome of the third round may indicate that the agent 310 has a "winning" outcome, based on a comparison of the importance factor of value 9 to the importance factor of value 2.

In some implementations, the system 300 may determine an aggregated outcome for each agent in the group of agents. For example, based on the "winning" outcomes of the first, second, and third rounds described above, the agent 310 may have an aggregate outcome of 3. The aggregate outcome of each of the agents may be included in the game outcome 355. In some cases, the energy allocation system 350 determines an allocation of energy based on the game outcome 355. The energy allocation system 350 may compare each aggregate outcome to a threshold 359. For example (and not by way of limitation) the threshold 359 may have a value of 2. An agent having an aggregate outcome that is equal or greater than the threshold 359 may receive an allocation of energy from the energy allocation system 350. For example, based on a comparison of the aggregate outcome with value 3 to the threshold 359 value of 2, the agent 310 may receive an allocation of energy.

In some implementations, an improvement in system performance may be determined based on the energy allocation using a cooperative comparison compared to an energy allocation based on a competitive comparison or a non-cooperative comparison. For example, energy consumption of multiple devices may be based on a sum of the allocated energy. In some cases, a measurement of the improvement in system performance is described by a "price of anarchy." Equation 2 describes an example technique for determining a price of anarchy.

$$PoA = \frac{Allocation_{Non-Coop}}{Allocation_{Coop}} \qquad \text{Eq. 2}$$

In Equation 2, a price of anarchy (e.g., PoA) may be determined based on a ratio of an energy allocation based on a non-cooperative comparison (e.g., $Allocation_{Non-Coop}$) with an energy allocation based on a cooperative comparison (e.g., $Allocation_{Coop}$). In some cases, the $Allocation_{Non-Coop}$ may be based on a sum of energy allocated to all devices requesting energy under a non-cooperative comparison. In addition, the $Allocation_{Coop}$ may be based on a sum of energy allocated to devices associated with "winning" agents under a cooperative comparison.

In regards to Table 1 and FIG. 3, for example, an energy allocation system may allocate energy to agent 310 and agent 330 (e.g., the fan and the light), and issue a command to agent 320 and agent 340 (e.g., the water heater and clothes dryer) to enter a low-power state. In addition, the performance of the group of agents 310, 320, 330, and 340 may include a consumption of 90 W of energy (e.g., a sum of 30 W and 90 W of energy, as allocated to the fan and the light). In an alternative example, if energy were allocated to all devices (e.g., the fan, the water heater, the light, and the clothes dryer) based on a non-cooperative comparison, all devices may receive the requested amount of energy, and the performance of devices may include a consumption of 4,215 W of energy (e.g., a sum of 30 W, 1125 W, 90 W, and 3000 W of energy, as allocated to the fan, the water heater, the light, and the clothes dryer). In this example, the price of anarchy may be determined based on Equation 2 as approximately 46.8 (e.g., a ratio of 4,215 W and 90 W of energy). The determined price of anarchy may indicate that the example devices consume 46.8 times as much energy under a non-cooperative comparison as under a cooperative comparison.

Figure 4:
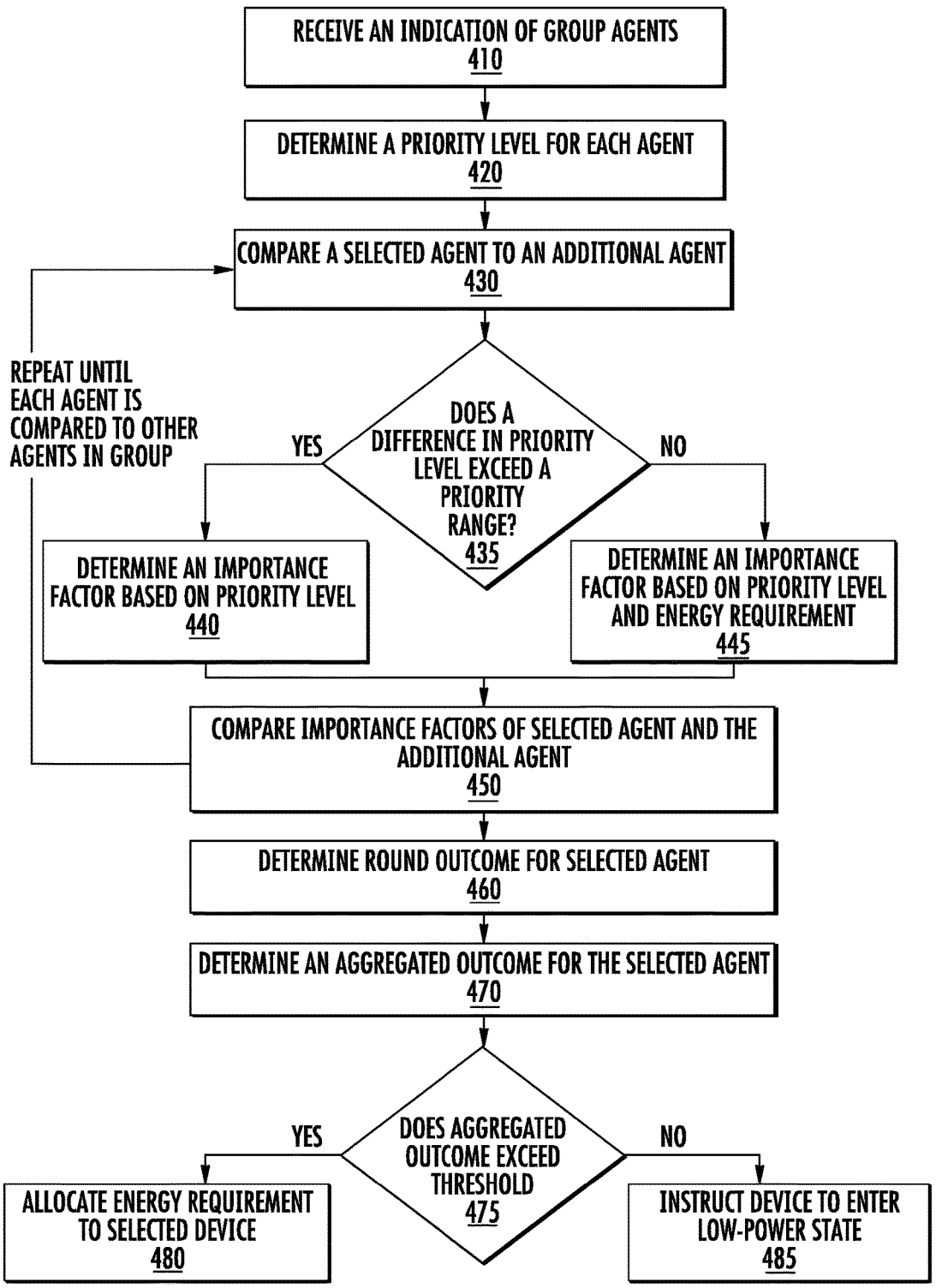
FIG. 4 is a flow chart depicting an example of a process for a cooperative comparison of agents corresponding to devices, based on a hybrid model.

FIG. 4 is a flow chart depicting an example of a process 400 for a cooperative comparison of agents based on a hybrid model for comparing priority levels. Operations related to process 400 may be performed as part of a round in a game, such as a round including a hybridized comparison. In some implementations, such as described in regards to FIGS. 1-3, a computing device executing an energy allocation system (e.g., a HEMS) implements operations described in FIG. 4, by executing suitable program code. Additionally or alternatively, operations described in FIG. 4 are implemented by one or more agents, such as a group of agents operating on respective IoT devices. For illustrative purposes, the process 400 is described with reference to the examples depicted in FIG. 1-3. Other implementations, however, are possible.

At block 410, the process 400 involves receiving an indication of a group of agents. The indication may be received by an energy allocation system, such as a HEMS, or by each agent in the group of agents. For example, each agent in the group of agents may receive an indication of other agents in the group. In some cases, an agent's participation in the cooperative comparison is based in part upon suitable security measures. In some cases, each agent corresponds to a device having a priority level and an energy requirement.

At block 420, the process 400 involves determining a priority level for each agent. For example, each agent may receive information indicating the respective priority level of the corresponding device. For example, the priority level may be indicated by data having a numeric value, a text value (e.g., "high," "low"), or any other suitable data structure or type. In some cases, each agent may receive information indicating the energy requirement of the corresponding device.

At block 430, the process 400 involves comparing a selected agent to an additional agent (e.g., a comparison agent) in the group. For example, a round of a game may include a pairwise comparison between the selected agent and the comparison agent. In some cases, the comparison is based on data that is associated with the selected agent or the comparison agent. For example, the comparison may be based on a priority level of the selected agent or an additional priority level of the comparison agent. The comparison may include determining a difference between the respective priority levels of the selected agent and the comparison agent. In some cases, the comparison may be performed by the energy allocation system. In addition, the comparison may be performed by one or more of the selected agent or the comparison agent.

At block 435, the process 400 involves comparing a priority range to the difference between the respective priority levels of the selected agent and the comparison agent. The value of the priority range may be determined by data stored in the energy allocation system or in one or more of the agents. In some cases, the value of the priority range may be determined at least in part based on user input. For example, a homeowner may provide input to the energy allocation system indicating a threshold or a goal (e.g., minimizing energy usage). If operations related to block 435 determine that the difference in priority levels exceeds the priority range, process 400 proceeds to another block, such as block 440. If operations related to block 435 determine that the difference in priority levels is within the priority range, process 400 proceeds to another block, such as block 445.

At block 440, the process 400 involves determining an importance factor for an agent based on the priority level of the agent. In some cases, the importance factor is based only on the priority level of the agent. For example, responsive to determining that a difference in priority levels exceeds a priority range, such as described in regards to block 435, the importance factor for the selected agent (or comparison agent) is determined to be the priority level for the selected agent (or comparison agent). In some cases, the importance factor based on the priority level may be adjusted based on additional information, such as a scaling factor or functional information from the device associated with the respective agent (e.g., an output level of the device, an expected length of time of the device's operation).

At block 445, the process 400 involves determining an importance factor for an agent based on a combination of the priority level of the agent and an energy requirement of the agent. For example, responsive to determining the difference in priority levels is within a priority range, such as described in regards to block 435, the importance factor for the selected agent (or comparison agent) is determined based on the ratio between the priority level and the energy requirement of the selected agent (or comparison agent). In some cases, the ratio may be multiplied by the sum of the energy requirements for all agents included in the round of the cooperative comparison. In addition, the importance factor based on the combination of the priority level and energy requirement may be adjusted based on additional information, such as a scaling factor or functional information from the device associated with the respective agent.

In some implementations, the importance factor for an agent, such as described in relation to blocks 440 and 445, may be represented by information associated with the agent, such as numerical data or another suitable data structure. In addition, the importance factor may be stored by one or more of the agent, the energy allocation system, or another suitable computing system.

At block 450, the process 400 involves comparing the importance factor of the selected agent to the importance factor of the comparison agent. For example, the importance factors may be compared to determine a maximum, a minimum, a percentage difference, or another suitable relationship.

At block 460, the process 400 involves determining a round outcome for the selected agent. The round outcome may be based on the comparison of the selected agent's importance factor to the additional agent's importance factor, as described in regards to block 450. In some cases, the round outcome may be associated with one or more of the selected agent or the comparison agent.

In some implementations, operations related to blocks 430, 435, 440, 445, 450, or 460 are repeated for each hybridized comparison performed in the cooperative comparison. For example, such operations may be performed for each round included in the game between the group of agents.

At block 470, the process 400 involves determining an aggregated outcome for the selected agent. The aggregated outcome may be based on a combination of the round outcomes for the selected agent. For example, if the selected agent is compared to three comparison agents (e.g., participates in a round with each of the three additional agents), the aggregated outcome for the selected agent may be determined based on the round outcome for each of the three comparisons. In some implementations, the aggregated outcome may be based on particular types of round outcomes (e.g., a numeric tally of "winning" round outcomes). In addition, the aggregated outcome may be based on a maximum, a minimum, a percentage, a summation, or any other suitable combination of the selected agent's round outcomes.

At block 475, the process 400 involves comparing the aggregated outcome for the selected agent to an allocation threshold. The allocation threshold may be determined based on an energy allocation strategy, such as a strategy to minimize energy consumption. In some cases, the comparison includes determining a maximum, a minimum, a percentage, or any other suitable relation between the aggregated outcome and the allocation threshold. If operations related to block 475 determine that the aggregated outcome exceeds or equals the allocation threshold, process 400 proceeds to another block, such as block 480. If operations related to block 475 determine that the aggregated outcome is less than the allocation threshold, process 400 proceeds to another block, such as block 485.

At block 480, the process 400 involves allocating energy to the device corresponding to the selected agent, based on the energy requirement of the selected agent. The allocation of energy may include providing an instruction to the device, such as an instruction to begin operation, enter a high-power state, or any other suitable instruction. For example, responsive to determining that the aggregated outcome of the selected agent exceeds the allocation threshold, such as described in regards to block 475, an instruction may be provided to the device corresponding to the selected agent. In some cases, the allocation of energy is determined based on functional information for the device. For example, a device that operates for a given length of time (e.g., a clothes dryer) may receive an allocation of energy appropriate to the given length of time.

At block 485, the process 400 involves providing an instruction to enter a low-power state. For example, responsive to determining that the aggregated outcome of the selected agent is less than the allocation threshold, such as described in regards to block 475, the instruction to enter the low-power state may be provided to the device corresponding to the selected agent. In some cases, the instruction to enter the low-power state may include additional information, such as a waiting period before the device re-requests an allocation of energy.

In some cases, the instruction provided to the device, such as described in regards to blocks 480 and 485, may include information interpreted by the device as operational adjustments. For example, the device may interpret the instructions as data indicating an adjustment to the device's power state, intensity level, a delay time (e.g., before re-requesting an allocation of energy or beginning operation), or another suitable operational adjustment.

Figure 5:
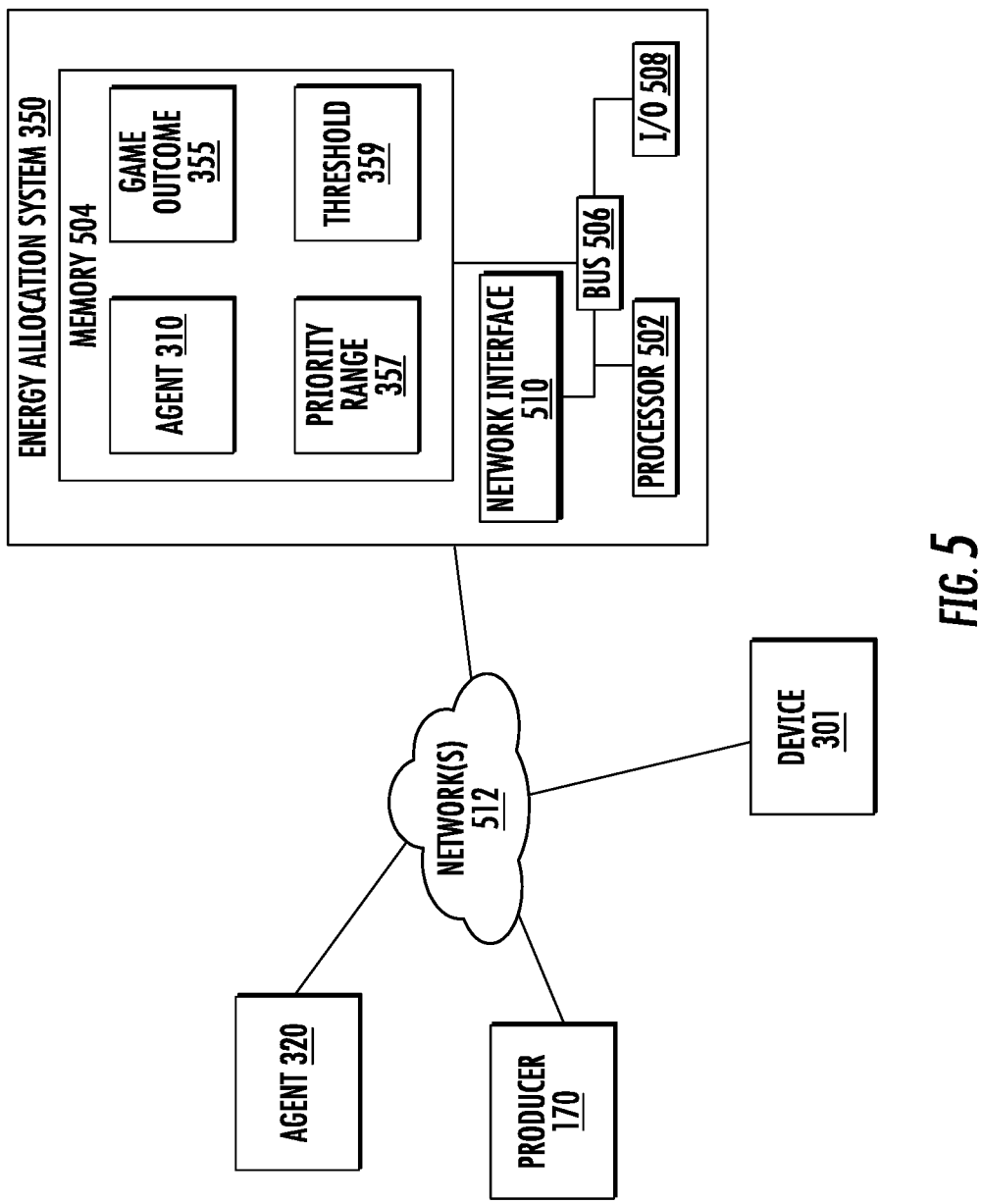
FIG. 5 is a block diagram depicting an example of a system for allocating electrical energy, based on a cooperative comparison of a group of agents.

Any suitable computing system or group of computing systems can be used for performing the operations described herein. For example, FIG. 5 is a block diagram depicting a system capable of allocating energy to one or more devices, according to certain implementations.

The depicted example of an energy allocation system 350 includes one or more processors 502 communicatively coupled to one or more memory devices 504. The processor 502 executes computer-executable program code or accesses information stored in the memory device 504. Examples of processor 502 include a microprocessor, an application-specific integrated circuit ("ASIC"), a field-programmable gate array ("FPGA"), or other suitable processing device. The processor 502 can include any number of processing devices, including one.

The memory device 504 includes any suitable non-transitory computer-readable medium for storing one or more agents, such as agent 310, the game outcome 355, the priority range 357, the threshold 359, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The energy allocation system 350 may also include a number of external or internal devices such as input or output devices. For example, the energy allocation system 350 is shown with an input/output ("I/O") interface 508 that can receive input from input devices or provide output to output devices. A bus 506 can also be included in the energy allocation system 350. The bus 506 can communicatively couple one or more components of the energy allocation system 350.

The energy allocation system 350 executes program code that configures the processor 502 to perform one or more of the operations described above with respect to FIGS. 1-4. The program code includes operations related to, for example, one or more of the agent 310, the game outcome 355, the priority range 357, the threshold 359, or other suitable applications or memory structures that perform one or more operations described herein. The program code may be resident in the memory device 504 or any suitable computer-readable medium and may be executed by the processor 502 or any other suitable processor. In some implementations, one or more agents, such as agent 310, the game outcome 355, the priority range 357, or the threshold 359 are stored in the memory device 504, as depicted in FIG. 5. In additional or alternative implementations, one or more of the agent 310, the game outcome 355, the priority range 357, the threshold 359, and the program code described above are stored in one or more memory devices accessible via a data network, such as a memory device accessible via a cloud service.

The energy allocation system 350 depicted in FIG. 5 also includes at least one data network interface 510. The data network interface 510 includes any device or group of devices suitable for establishing a wired or wireless data connection to one or more data networks 512. Non-limiting examples of the data network interface 510 include an Ethernet data network adapter, a modem, and/or the like. In some cases, the data network 512 is included in an energy distribution network, such as data transmitted via a power line communication ("PLC") protocol. Additional agents, such as agent 320, may be connected to the energy allocation system 350 via data network 512, and the additional agents can perform some or all of the operations described herein. In some cases, a device, such as device 301, is associated with the agent 310 stored in memory 504. The energy allocation system 350 is able to communicate with one or more of the additional agent 320, producer 170, or device 301 using the data network interface 510. Although FIG. 5 depicts the producer 170 as connected to energy allocation system 350 via the data networks 512, other implementations are possible, including the producer 170 communicating with one or more of agent 320 or device 301 via the data networks 512.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific implementations thereof, it will be appreciated that those skilled in the art, upon attaining an understanding of the foregoing, may readily produce alterations to, variations of, and equivalents to such implementations. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A system for allocating energy among multiple agents, each agent corresponding to a device having an energy requirement level and a priority level, the system comprising at least one memory device and at least one processor, the at least one processor configured to perform operations comprising:

determining, from the multiple agents, a group of agents;
for each agent in the group of agents:
designating the agent as a selected agent and each of a remainder of the agents as a comparison agent;
for each comparison agent:
comparing the priority level of the selected agent with the priority level of the comparison agent,
based on the compared priority levels, determining an importance factor for the selected agent and an importance factor for the comparison agent, wherein:
when a difference between the priority level of the selected agent and the priority level of the comparison agent is outside a priority range wherein a value of the priority range is determined based on an input indicating an energy allocation goal, determining the importance factor for the selected agent based on the priority level of the selected agent, and determining the importance factor for the comparison agent based on the priority level of the comparison agent,
when the difference in the priority level of the selected agent and the priority level of the comparison agent is within the priority range, determining the importance factor for the selected agent based on a combination of the energy requirement level and the priority level for the selected agent, and determining the importance factor for the comparison agent based on a combination of the energy requirement level and the priority level for the comparison agent, and
comparing the importance factor for the selected agent and the importance factor for the comparison agent, and determining an outcome based on the compared importance factors;
determining an aggregated outcome for the selected agent, based on the outcomes for the selected agent and each of the comparison agents, and comparing the aggregated outcome to an allocation threshold; and
based on the comparison of the aggregated outcome to the allocation threshold, providing an instruction for the device corresponding to the selected agent, wherein:
when the aggregated outcome exceeds the allocation threshold, the instruction indicates allocating the energy requirement level to the device corresponding to the selected agent,
when the aggregated outcome is less than the allocation threshold, the instruction directs the device corresponding to the selected agent to enter a low-power state.

2. The system of claim 1, wherein the low-power state includes one of a powered-off state, a standby state, a shortened period of operation, or a state of minimal energy consumption.

3. The system of claim 1, wherein the respective energy requirement of each of the multiple agents is determined based on a period of time that is the same for each of the multiple agents.

4. The system of claim 1, the operations further comprising adjusting a value of the priority level of the corresponding device, wherein:
when the instruction directs the corresponding device to enter a low-power state, the value of the priority level is adjusted.

5. The system of claim 1, wherein when the aggregated outcome exceeds or equals the allocation threshold, the instruction further indicates a delay time before the device begins operation.

6. The system of claim 1, wherein when the aggregated outcome is less than the allocation threshold, the instruction includes a delay time before the device re-requests an allocation of energy.

7. The system of claim 1, wherein comparing the priority level of the selected agent with the priority level of the comparison agent is a pairwise comparison.

8. The system of claim 1, wherein comparing the priority level of the selected agent with the priority level of the comparison agent is performed by one or more of the selected agent or the comparison agent.

9. A method of allocating energy among multiple agents, each agent corresponding to a device having an energy requirement level and a priority level, the method comprising:
for each agent:
designating the agent as a selected agent and each of a remainder of the agents as a comparison agent;
for each comparison agent:
comparing the priority level of the selected agent with the priority level of the comparison agent,
based on the compared priority levels, determining an importance factor for the selected agent and an importance factor for the comparison agent, wherein:
when a difference between the priority level of the selected agent and the priority level of the comparison agent is outside a priority range wherein a value of the priority range is determined based on an input indicating an energy allocation goal, determining the importance factor for the selected agent based on the priority level of the selected agent, and determining the importance factor for the comparison agent based on the priority level of the comparison agent,
when the difference in the priority level of the selected agent and the priority level of the comparison agent is within the priority range, determining the importance factor for the selected agent based on a combination of the energy requirement level and the priority level for the selected agent, and determining the importance factor for the comparison agent based on a combination of the energy requirement level and the priority level for the comparison agent, and
comparing the importance factor for the selected agent and the importance factor for the comparison agent, and determining an outcome based on the compared importance factors;
determining an aggregated outcome for the selected agent, based on the outcomes for the selected agent and each of the comparison agents, and comparing the aggregated outcome to an allocation threshold; and
based on the comparison of the aggregated outcome to the allocation threshold, providing an instruction for the device corresponding to the selected agent, wherein:
when the aggregated outcome exceeds the allocation threshold, the instruction indicates allocating the energy requirement level to the device corresponding to the selected agent,
when the aggregated outcome is less than the allocation threshold, the instruction directs the device corresponding to the selected agent to enter a low-power state.

10. The method of claim 9, wherein the low-power state includes one of a powered-off state, a standby state, a shortened period of operation, or a state of minimal energy consumption.

11. The method of claim 9, the method further comprising adjusting a value of the priority level of the corresponding device, wherein:
when the instruction directs the corresponding device to enter a low-power state, the value of the priority level is adjusted.

12. The method of claim 9, wherein when the aggregated outcome exceeds or equals the allocation threshold, the instruction further indicates a delay time before the device begins operation.

13. The method of claim 9, wherein when the aggregated outcome is less than the allocation threshold, the instruction includes a delay time before the device re-requests an allocation of energy.

14. The method of claim 9, wherein comparing the priority level of the selected agent with the priority level of the comparison agent is performed by one or more of the selected agent or the comparison agent.

15. The method of claim 9, wherein the aggregated outcome for the selected agent is based on a number of times the importance factor for the selected agent exceeded the importance factors for each of the comparison agents.

16. A system for allocating energy among multiple agents, the system comprising a home energy management system having at least one memory device and at least one processor, the at least one processor configured to perform operations comprising:
for each agent of the multiple agents, determining a corresponding device having an energy requirement level and a priority level, wherein the corresponding device is capable of receiving an allocated quantity of energy via the home energy management system;
receiving, from each agent of the multiple agents, the respective energy requirement level and priority level of the corresponding device;
for each agent of the multiple agents:
designating the agent as a selected agent and each of a remainder of the agents as a comparison agent;
for each comparison agent:
comparing the priority level of the selected agent with the priority level of the comparison agent, based on the compared priority levels, determining an importance factor for the selected agent and an importance factor for the comparison agent, wherein:
- when a difference between the priority level of the selected agent and the priority level of the comparison agent is outside a priority range wherein a value of the priority range is determined based on an input indicating an energy allocation goal, determining the importance factor for the selected agent based on the priority level of the selected agent, and determining the importance factor for the comparison agent based on the priority level of the comparison agent,
- when the difference in the priority level of the selected agent and the priority level of the comparison agent is within the priority range, determining the importance factor for the selected agent based on a combination of the energy requirement level and the priority level for the selected agent, and determining the importance factor for the comparison agent based on a combination of the energy requirement level and the priority level for the comparison agent, and comparing the importance factor for the selected agent and the importance factor for the comparison agent, and determining an outcome based on the compared importance factors;

determining an aggregated outcome for the selected agent, based on the outcomes for the selected agent and each of the comparison agents;

comparing the aggregated outcome to an allocation threshold; and based on the comparison of the aggregated outcome to the allocation threshold, providing an instruction for the corresponding device of the selected agent, wherein:
- when the aggregated outcome exceeds the allocation threshold, the instruction indicates allocating the energy requirement level to the corresponding device,
- when the aggregated outcome is less than the allocation threshold, the instruction directs the corresponding device to enter a low-power state; and providing, to the corresponding device of each agent of the multiple agents, the allocated quantity of energy, wherein the allocated quantity of energy is based on the respective instruction provided for the respective corresponding device.

17. The system of claim 16, wherein the selected agent and the comparison agent are included in a group of the multiple agents, the group of agents determined based on one or more of a location, a function, or a type of operation.

18. The system of claim 16, wherein the priority level of the corresponding device is determined, by the home energy management system, based on one or more of a function of the corresponding device, a period of time associated with the corresponding device, or an attribute associated with the corresponding device.

19. The system of claim 16, wherein the energy requirement level of the corresponding device is determined, by the home energy management system, based on one or more of a function of the corresponding device, a level of operation, or a period of time.

20. The system of claim 16, the operations further comprising adjusting a value of the priority level of the corresponding device, wherein:
- when the instruction directs the corresponding device to enter a low-power state, the value of the priority level is adjusted.

* * * * *